US012106649B2

(12) United States Patent
Tsai et al.

(10) Patent No.: US 12,106,649 B2
(45) Date of Patent: Oct. 1, 2024

(54) SMOKE DETECTOR CAPABLE OF DISTINGUISHING SMOKE AND PARTICLES

(71) Applicant: PixArt Imaging Inc., Hsin-Chu County (TW)

(72) Inventors: Cheng-Nan Tsai, Hsin-Chu County (TW); Guo-Zhen Wang, Hsin-Chu County (TW); Ching-Kun Chen, Hsin-Chu County (TW); Yen-Chang Chu, Hsin-Chu County (TW); Chih-Ming Sun, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 18/509,350

(22) Filed: Nov. 15, 2023

(65) Prior Publication Data

US 2024/0078887 A1 Mar. 7, 2024

Related U.S. Application Data

(60) Continuation of application No. 18/111,605, filed on Feb. 20, 2023, now Pat. No. 11,854,361, which is a division of application No. 17/320,222, filed on May 14, 2021, now Pat. No. 11,615,684.

(60) Provisional application No. 63/117,479, filed on Nov. 24, 2020.

(51) Int. Cl.
*G08B 17/10* (2006.01)
*G08B 17/107* (2006.01)

(52) U.S. Cl.
CPC .................................. *G08B 17/107* (2013.01)

(58) Field of Classification Search
CPC .................................................. G08B 17/107
See application file for complete search history.

(56) References Cited

U.S. PATENT DOCUMENTS

| | | | | |
|---|---|---|---|---|
| 4,469,953 | A * | 9/1984 | Fujisawa | G08B 17/113 356/338 |
| 4,906,978 | A | 3/1990 | Best et al. | |
| 5,280,272 | A | 1/1994 | Nagashima et al. | |
| 6,521,907 | B1 * | 2/2003 | Shoaff | G08B 17/107 356/628 |
| 11,615,684 | B2 * | 3/2023 | Tsai | G08B 29/26 340/630 |
| 2004/0063154 | A1 | 4/2004 | Booth et al. | |
| 2006/0261967 | A1 * | 11/2006 | Marman | G08B 17/103 340/630 |

(Continued)

FOREIGN PATENT DOCUMENTS

| | | | |
|---|---|---|---|
| CN | 103782327 | A | 5/2014 |
| CN | 104392577 | A | 3/2015 |
| CN | 207489209 | U | 6/2018 |

*Primary Examiner* — Travis R Hunnings
(74) *Attorney, Agent, or Firm* — WPAT, P.C.

(57) ABSTRACT

There is provided a smoke detector including a first light source, a second light source surface, a light sensor and a processor. The light sensor receives reflected light when the first light source and the second light source emit light, and generates a first detection signal corresponding to light emission of the first light source and a second detection signal corresponding to light emission of the second light source. The processor distinguishes smoke and floating particles according to a similarity between the first detection signal and the second detection signal.

20 Claims, 10 Drawing Sheets

12

100

(56) References Cited

U.S. PATENT DOCUMENTS

| | | | | |
|---|---|---|---|---|
| 2009/0009348 | A1* | 1/2009 | Mizuo | G08B 17/107 340/630 |
| 2010/0328085 | A1* | 12/2010 | Bohanon | G08B 29/24 340/630 |
| 2011/0031419 | A1* | 2/2011 | Fukui | H03F 3/087 250/574 |
| 2012/0050030 | A1* | 3/2012 | Murphy | G08B 29/145 340/514 |
| 2013/0033699 | A1* | 2/2013 | Brigham | G08B 17/107 356/338 |
| 2013/0201479 | A1 | 8/2013 | Vollenweider | |
| 2014/0111803 | A1* | 4/2014 | Matsukuma | G08B 17/113 356/338 |
| 2015/0146204 | A1* | 5/2015 | Shibuya | G08B 17/113 356/338 |
| 2015/0302727 | A1* | 10/2015 | Piccolo, III | G08B 17/107 340/514 |
| 2016/0140817 | A1* | 5/2016 | Beagley | G08B 13/1645 340/555 |
| 2017/0287318 | A1* | 10/2017 | Moffa | G08B 29/043 |
| 2018/0180540 | A1* | 6/2018 | Iguchi | G08B 17/10 |
| 2018/0306715 | A1* | 10/2018 | Yamasaki | G01N 21/53 |
| 2020/0175848 | A1* | 6/2020 | Deliwala | G01N 21/274 |
| 2021/0166542 | A1* | 6/2021 | Patel | G08B 29/145 |
| 2021/0295667 | A1* | 9/2021 | Zu | G08B 17/113 |
| 2021/0312779 | A1* | 10/2021 | Gadonniex | G08B 17/107 |
| 2022/0165141 | A1* | 5/2022 | Tsai | G08B 29/26 |
| 2022/0244160 | A1* | 8/2022 | Lollio | G01N 21/53 |
| 2022/0268682 | A1* | 8/2022 | Chu | G08B 29/18 |
| 2022/0358820 | A1* | 11/2022 | Muro | G08B 17/06 |
| 2023/0206743 | A1* | 6/2023 | Tsai | G08B 17/107 340/630 |

* cited by examiner

| | | | |
|---|---|---|---|
| profile1 | intensity>=A1,slope>=B1,signal ratio<=C1 … | interval 1 | smoke type1 |
| profile2 | intensity>=A2,slope>=B2,signal ratio<=C2 … | interval 2 | smoke type2 |
| profile3 | intensity>=A3,slope>=B3,signal ratio<=C3 … | interval 3 | smoke type3 |
| profile4 | intensity>=A4,slope>=B4,signal ratio<=C4 … | interval 4 | smoke type4 |

FIG. 6

SMOKE DETECTOR CAPABLE OF DISTINGUISHING SMOKE AND PARTICLES

CROSS REFERENCE TO RELATED APPLICATION

The present application is a continuation application of U.S. application Ser. No. 18/111,605, filed on Feb. 20, 2023, which is a divisional application of U.S. application Ser. No. 17/320,222, filed on May 14, 2021, which claims the priority benefit of U.S. Provisional Application Ser. No. U.S. 63/117,479, filed on Nov. 24, 2020, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a smoke detector and, more particularly, to a smoke detector that reduces the possibility of false alarm and is adaptable to different standards.

2. Description of the Related Art

In current optoelectronic smoke detectors, a light sensor does not receive any reflected light of a light source when there is no smoke. The light sensor receives reflected or scattered light of the light source only when there is smoke entering the smoke detector. Meanwhile, an inner surface of the smoke detector is coated with light absorption material to avoid inner reflection without smoke therein. However, when there is enough dust accumulated in the smoke detector, the inner reflection of light inside the smoke detector is still generated and received by the light sensor such that a false alarm may be triggered.

The scattered smoke detector operates in a way that when scattered light intensity generated by the smoke is larger than a single alarm threshold, the alarm is activated.

However, due to the smoke generated by different types of fire having different interactions with light, e.g., smoke generated by smolder creating multiple times of scattered light than smoke generated by flame, the single alarm threshold can cause the smoke detector to be too sensitive to some types of smoke to trigger a false alarm but not sensitive enough to other types of smoke to delay the alarm time.

Furthermore, the environment generally has many disturbances such as moisture, vapor, oil smoke, fume, particles and bugs that may change the reflected light intensity to cause a false alarm. The commercial available smoke detector has a high false alarm rate due to these reasons, but the false alarm can be treated only by negative methods such as not to arrange the smoke detector in a spot having high disturbances (e.g., kitchen, bathroom or garage) to reduce the possibility of false alarm, but there is no complete and useful solving method.

Accordingly, the present disclosure provides a smoke detector that effectively reduces the false alarm rate and is adaptable to different standards.

SUMMARY

The present disclosure provides a smoke detector that detects reference light energy when there is no smoke entering the smoke detector, and the reference light energy is used as a reference in identifying whether a fire occurs.

The present disclosure further provides a smoke detector that avoids reflected light from accumulated dust being received by a light sensor so as to reduce the false alarm rate.

The present disclosure further provides a smoke detector that automatically adjusts or alters multiple condition thresholds according to the detection result of a light sensor so as to reduce the false alarm rate.

The present disclosure provides a smoke detector including a base, a cover, a first light source, a second light source, a light sensor and a processor. The cover is combined to the base to form an inner space between the base and the cover. The first light source is arranged on the base and configured to emit light of a wavelength toward the inner space. The second light source is arranged on the base and configured to emit light of the wavelength toward the inner space. The light sensor is arranged on the base between the first light source and the second light source, and configured to generate a first detection signal in response to light emission of the first light source and generate a second detection signal in response to light emission of the second light source. The processor distinguishes smoke and floating particles in the inner space according to a similarity between the first detection signal and the second detection signal.

The present disclosure further provides a smoke detector including a base, a cover, a first light source, a second light source, a light sensor and a processor. The cover is combined to the base to form an inner space between the base and the cover. The first light source is arranged on the base and configured to emit light of a first wavelength toward the inner space. The second light source is arranged on the base and configured to emit light of a second wavelength, different from the first wavelength, toward the inner space. The light sensor is arranged on the base, and configured to generate a first detection signal in response to light emission of the first light source and generate a second detection signal in response to light emission of the second light source, wherein the first light source and the second light source are arranged at a same side of the light sensor. The processor identifies smoke and floating particles according to a relationship of features between the first detection signal and the second detection signal.

BRIEF DESCRIPTION OF THE DRAWINGS

Other objects, advantages, and novel features of the present disclosure will become more apparent from the following detailed description when taken in conjunction with the accompanying drawings.

FIG. 6 is a schematic diagram of multiple sets of predetermined condition thresholds corresponding to different profiles of detection signal and different types of smoke configured in a smoke detector of the present disclosure.

DETAILED DESCRIPTION OF THE EMBODIMENT

It should be noted that, wherever possible, the same reference numbers will be used throughout the drawings to refer to the same or like parts.

The smoke detector of the present disclosure has a processor which is embedded with a categorizer for distinguishing different types of smoke or particles to accordingly change condition thresholds for triggering an alarm based on the detection result so as to reduce the false alarm rate. Furthermore, the smoke detector of the present disclosure is further arranged with protrusion structures to block scattered and reflected light from accumulated dust and/or arranged with multiple light sources for distinguishing a type of disturbance. Said disturbance includes the smoke, particle, vapor and dust.

Figure 1A:
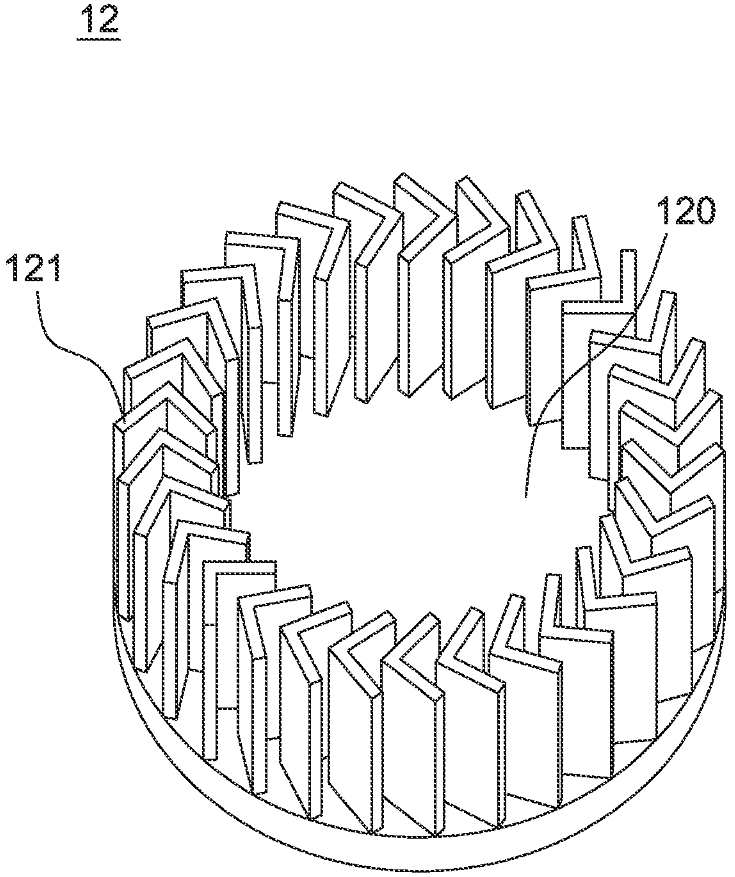
FIG. 1A is a solid diagram of a cover of a smoke detector according to a first embodiment of the present disclosure.
Figure 1B:
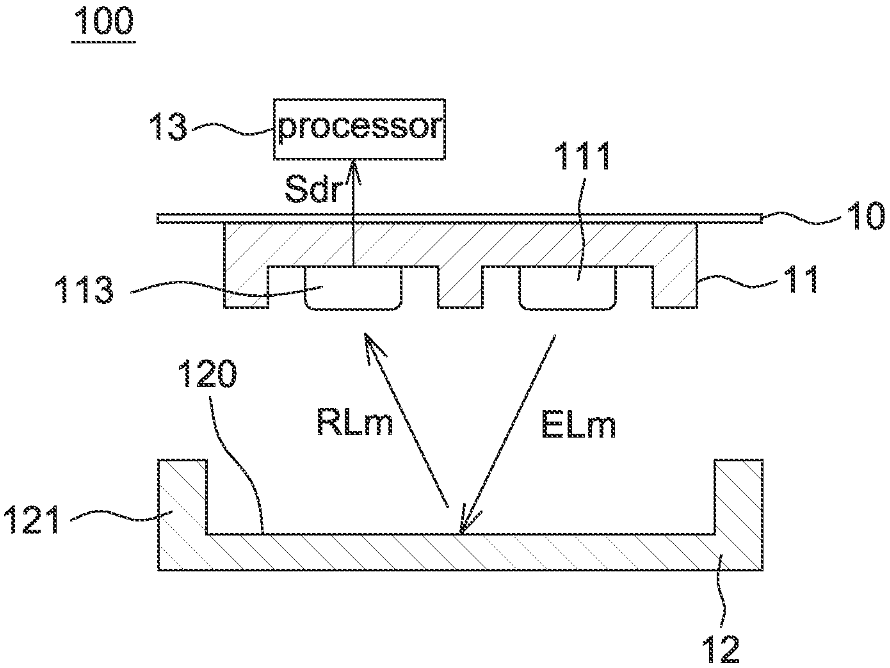
FIG. 1B is a cross sectional view of a smoke detector according to a first embodiment of the present disclosure.
Figure 1C:
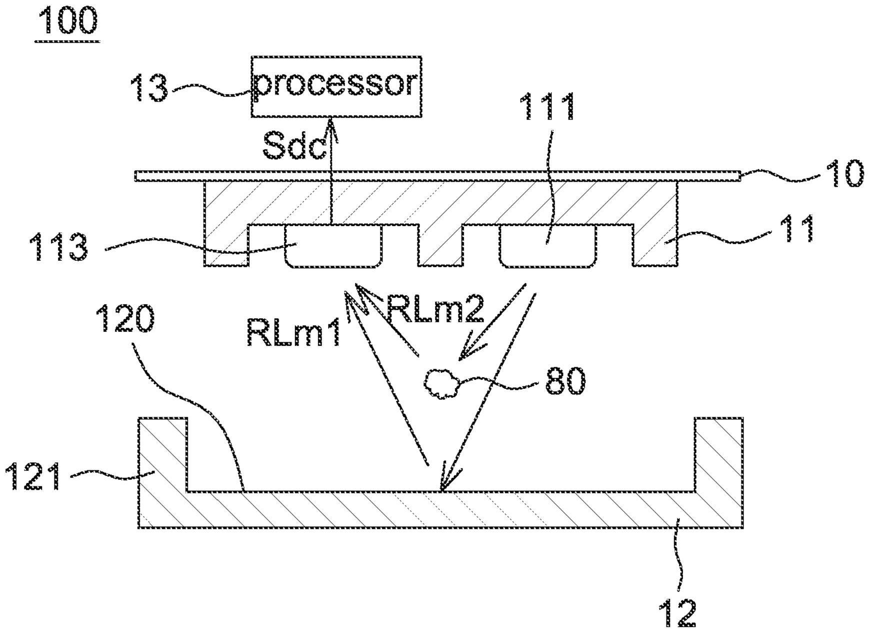
FIG. 1C is another cross sectional view of a smoke detector according to a first embodiment of the present disclosure.

Referring to FIGS. 1A to 1C, FIG. 1A is a solid diagram of a cover 12 of a smoke detector 100 according to a first embodiment of the present disclosure; FIG. 1B is a cross sectional view of the smoke detector 100 according to a first embodiment of the present disclosure; and FIG. 1C is another cross sectional view of the smoke detector 100 according to a first embodiment of the present disclosure which shows that the reflected light is increased due to smoke 80 entering a sensing space of the smoke detector 100.

The smoke detector 100 includes a sensing device 11 and a cover 12. The cover 12 covers on the sensing device 11 such that the sensing device 11 is arranged inside an inner space (configured as the sensing space) of the cover 12. For example, the sensing device 11 is arranged on a base 10 which has an area larger than or equal to that of the cover 12. One side of the base 10 is combined with the cover 12 and the other side thereof is attached to a wall or ceiling on which the smoke detector 100 is arranged. The material of the base 10 is, for example, plastic, glass or wood plate without particularly limitations.

The cover 12 includes a reflective surface 120 and a side wall 121. The side wall 121 extends out from an edge or a region close to the edge of the reflective surface 120, e.g., FIGS. 1B and 1C showing that the side wall 121 perpendicularly extends out from the reflective surface 120 toward the sensing device 11, but the side wall 121 is not limited to be perpendicular to the reflective surface 120, e.g., having a tilt angle. To allow the air (including smoke if existence) to enter the inner space of the smoke detector 100, the side wall 121 has apertures. For example, FIG. 1A shows one example in which the side wall 121 includes multiple separated pillars extending out from the edge of the reflective surface 120, and spaces between the pillars are used as the apertures. To prevent external light from entering the inner space of the smoke detector 100 to degrade the sensing ability, the side wall 121 is preferably arranged in a way that the inner space is not seen from outside of the cover 12, but the shape of the pillars is not limited to that shown in FIG. 1A. The reflective surface 120 is used to reflect emission light of the light source 111.

In another aspect, the side wall 121 extends out from the base 10 (e.g., downward in FIGS. 1B and 1C), and the cover 12 is a plate without any sidewall. The cover 12 seals the sensing space of the smoke detector 100 by attaching to the top of the side wall 121 on the base 10. In an alternative aspect, the base 10 and the cover 12 have respective side walls 121 opposite to each other, and the cover 12 seals the sensing space of the smoke detector 100 by combining tops of the side walls 121 of the base 10 and the cover 12 together. The cover 12 is combined to the base 10 using adhesive or fixed member(s) without particular limitations.

The sensing device 11 includes a light source 111, a light sensor 113, and a processor 13 electrically coupled to the light source 111 and the light sensor 113. A light blocking wall is preferably arranged between the light source 111 and the light sensor 113.

The smoke detector of the present disclosure is arranged in the way that when there is no smoke entering the inner space thereof, the light sensor still receives reference light intensity to generate a reference detection signal Sdr. The light source 111 is preferably a non-coherent light source, e.g., a light emitting diode. The light source 111 projects a main beam ELm toward the reflective surface 120 to generate a main reflected beam RLm reflected from the reflective surface 120, wherein the main beam ELm herein is referred to light within an emission angle of the light source 111. In other aspects, if light source 111 is arranged with optics to expand an emission angle of the light source 111, the light source 111 could be a laser diode.

The light sensor 113 is, for example, a CMOS image sensor, a photodiode, a SPAD or the like, which senses reflected light (including at least a part of the main reflected beam RLm) from the reflective surface 120 at a predetermined frequency to generate a detection signal. For example, the light sensor 113 is arranged at a path or at a region close to the path of the main reflected beam RLm, but not limited thereto.

The processor 13 is, for example, a micro controller unit (MCU) or an application specific integrated circuit (ASIC). The processor 13 receives a reference detection signal Sdr (as shown in FIG. 1B) from the light sensor 113 when there is no smoke entering or interrupting the main reflected beam RLm, and receives a current detection signal Sdc (as shown in FIG. 1C) from the light sensor 113 when there is smoke entering or interrupting the main reflected beam RLm. In one aspect, the magnitude of the reference detection signal Sdr is determined according to the spatial relationship between the light source 111, the light sensor 113, the side wall 121 and the reflective surface 120 as well as the reflection coefficient of the reflective surface 120.

Figure 9:
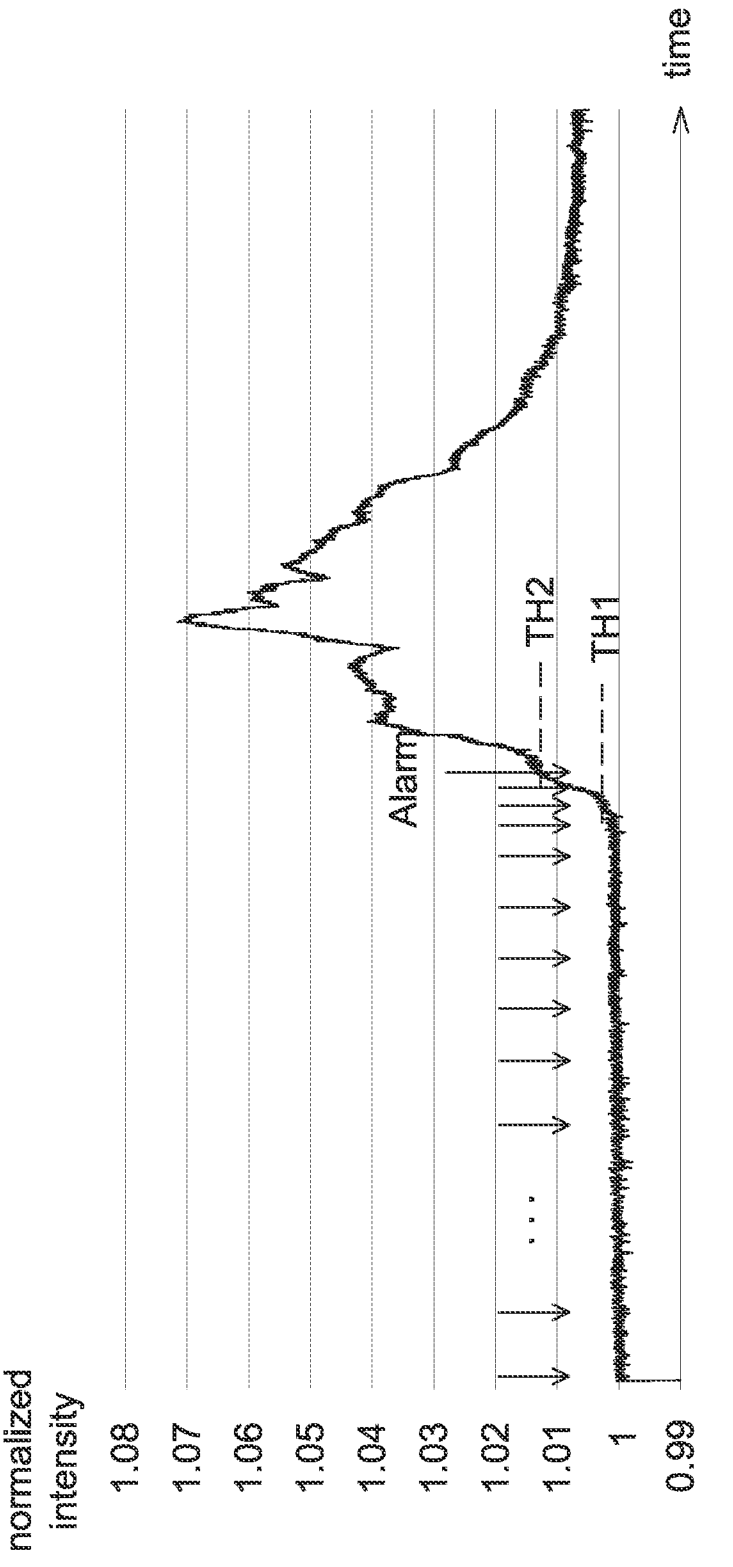
FIG. 9 is an operational schematic diagram of a smoke detector according to one embodiment of the present disclosure in which the smoke detector has changeable sensing frequencies.

The processor 13 identifies whether to give an alarm according to a signal ratio between the current detection signal Sdc and the reference detection signal Sdc, e.g., Sdc/Sdr or (Sdc-Sdr)/Sdr. As shown in FIG. 1C, when the smoke 80 enters the inner space (e.g., intervening a path of the main reflected beam RLm), the light sensor 113 detects both the reflected light RLm1 (reflected by the reflective surface 120) and RLm2 (reflected by the smoke 80) such that Sdc>Sdr, wherein Sdc is generated mainly by a summation of RLm1 and RLm2 as shown in FIG. 1C, and Sdr is generated mainly by RLm as shown in FIG. 1B. For example, when the signal ratio (also called normalized intensity herein) Sdc/Sdr or (Sdc−Sdr)/Sdr exceeds a predetermined value, e.g., TH2 showing in FIG. 9, the processor 13 controls a speaker or the coupled host (not shown) to give an alarm. For example, the smoke detector 100 or said host has a speaker. The normalized intensity in FIG. 9 is calculated by Sdc/Sdr.

More specifically, in the first embodiment, when the light source 111 and the light sensor 113 are arranged substantially at the same height in the inner space, the light source 111 and the light sensor 113 are symmetrically arranged at two sides, e.g., left and right sides in FIG. 1B, of a reflection spot on the reflective surface 120. It is appreciated that when the reflective surface 120 is not parallel to a plane of said same height, the light source 111 and the light sensor 113 are not symmetrically arranged at two sides of the reflection spot. For example, the light sensor 11 is arranged at a region receiving the maximum reflected light.

In another aspect, the light sensor 11 is arranged close to (not at) the region receiving the maximum reflected light in order not to cause the reference detection signal Sdr too large that can reduce the sensitive of the light source 11. As mentioned above, the current detection signal Sdc is larger than the reference detection signal Sdr, intensity of the reference detection signal Sdr is preferably not at the maximum detectable value of the light sensor 113.

Figure 2:
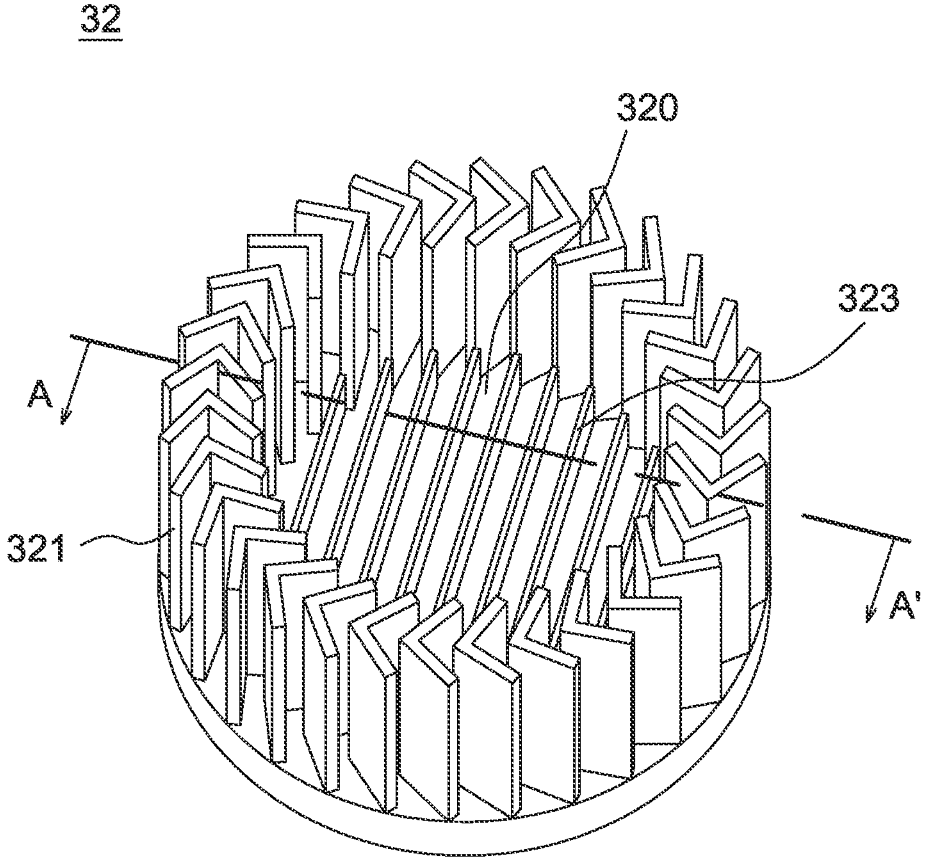
FIG. 2 is a solid diagram of a cover of a smoke detector according to a second embodiment of the present disclosure.
Figure 3:
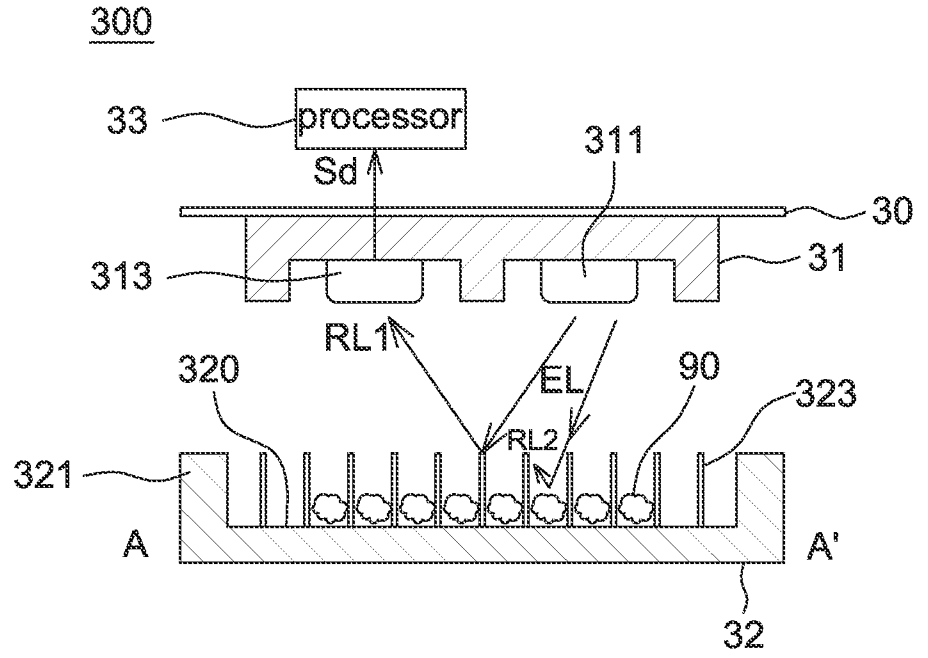
FIG. 3 is a cross sectional view of a smoke detector according to a second embodiment of the present disclosure in which a cross section of the cover is shown along line A-A' in FIG. 2.
Figure 4:
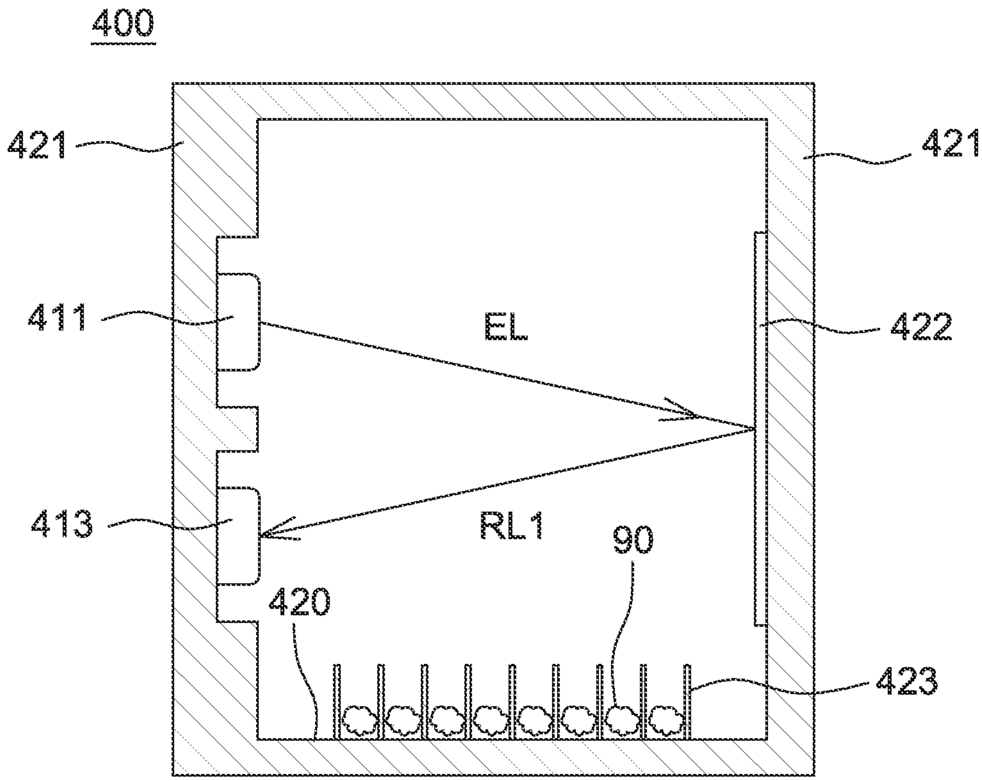
FIG. 4 is a side view of an alternative of a smoke detector according to a second embodiment of the present disclosure.

Please refer to FIGS. 2 to 4, FIG. 2 is a solid diagram of a cover 32 of a smoke detector 300 according to a second embodiment of the present disclosure; FIG. 3 is a cross sectional view of the smoke detector 300 according to a second embodiment of the present disclosure in which a cross section of the cover 32 is shown along line A-A' in FIG. 2; and FIG. 4 is a schematic diagram of an alternative of the smoke detector 300 according to a second embodiment of the present disclosure.

The smoke detector 300 also includes a sensing device 31 and a cover 32. The cover 32 covers on the sensing device 31 such that the sensing device 31 is arranged inside an inner space (configured as a sensing space) of the smoke detector 300. Similarly, the sensing device 31 is arranged on a base 30 which has an area larger than or equal to that of the cover 32. The base 30 is also combined with the cover 32 and attached to a wall or ceiling on which the smoke detector 300 is arranged. Similarly, the material of the base 10 is not particularly limited.

In the second embodiment, the configuration of the sensing device 31 is identical to the sensing device 11 of the first embodiment only being indicated with different reference numerals. The light sensor 313 receives reflected light RL1 of an emission light beam EL of the light source 311 so as to generate a detection signal Sd. The difference between the second embodiment and the first embodiment is at the structure of the cover 32.

The cover 32 includes a bottom surface 320 and a side wall 321. The side wall 321 is identical to the side wall 121 of the first embodiment. The side wall 321 extends out from an edge of the bottom surface 320 and has apertures. For example, the side wall 321 includes multiple separated pillars extending out from the edge of the bottom surface 320. Similar to the first embodiment, the side wall 321 is arranged on the base 30, or on both the bottom surface 320 and the base 30 in different aspects.

In the second embodiment, the bottom surface 320 further includes multiple protrusions 323 extending out from the bottom surface 320. The multiple protrusions 323 are used to block reflected light RL2 reflected by the bottom surface 320 (or dust 90 if accumulated). As shown in FIG. 3, the light sensor 313 mainly receives reflected light RL1 reflected by the upper surface of the multiple protrusions 323 to generate a detection signal Sd. Therefore, even though there is accumulated dust 90 on the bottom surface 320, most of the reflected light RL2 reflected by the dust 90 is blocked by the multiple protrusions 323 without being received by the light sensor 313. Accordingly, whether there is dust 90 accumulated on the bottom surface 320 or not does not affect a reference value of the detection signal Sd (i.e. reference detection signal).

As mentioned above, the present disclosure identifies whether an alarm should be given according to a signal ratio between a current value of the detection signal Sd (i.e. current detection signal) and the reference value of the detection signal Sdr (similar to FIG. 1B when there is no smoke entering the sensing space), e.g., the signal ratio=Sd/Sdr or (Sd−Sdr)/Sdr. According to the configuration of the second embodiment, since the reference value of the detection signal Sdr is not affected by the accumulated dust 90, the false alarm rate is effectively decreased.

It should be mentioned that although FIG. 2 shows that the multiple protrusions 323 are long strips parallel to one another, it is only intended to illustrate but not to limit the present disclosure. In other aspects, the multiple protrusions 323 are separated and interlacedly arranged circular cylinders, triangular cylinders, rectangular cylinders or a combination thereof without particular limitations as long as the reflected light RL2 is blocked. Furthermore, the height of the multiple protrusions 323 is determined according to a transverse distance between the light source 311 and the light sensor 313 as well as a longitudinal height of the sensing space without particular limitations as long as the reflected light RL2 is blocked by the multiple protrusions 323.

Furthermore, although FIG. 3 shows that the long-strip protrusions 323 extend on the whole bottom surface 320, the present disclosure is not limited thereto. In other aspects, the multiple protrusions 323 are arranged only within an illuminated range of the main beam of the light source 311. In another aspect, long-strip protrusions 323 parallel to one another are arranged within the illuminated range of the main beam of the light source 311, and long-strip protrusions 323 extending in different directions are arranged at other regions of the bottom surface 320.

Please refer to FIG. 3 again, in one aspect, the light source 311 and the light sensor 313 are arranged at an opposite surface of the bottom surface 320, and the multiple protrusions 323 are used to block the reflected light RL2 of the emission light beam EL of the light source 311 reflected by the bottom surface 320. As mentioned above, when the bottom surface 320 has accumulated dust 90, the reflected light RL2 is reflected by the dust 90. When the multiple protrusions 323 are long strips, an extending direction of the long strips is preferably perpendicular to a direction (e.g., a left-right direction in FIG. 3) of a transverse component of the emission light beam EL of the light source 311 so as to block the reflected light RL2 effectively.

Please refer to FIG. 4, which is a side view of an alternative of a smoke detector 400 according to a second embodiment of the present disclosure. In another aspect, the cover 32 further includes a reflective surface 422 arranged at an inner surface of the side wall 421. The light source 411 and the light sensor 413 are also arranged at the inner surface of the side wall 421 but opposite to the reflective surface 422. Similar to the first embodiment, the side wall 421 extends upward from the cover or downward from the base according to different applications. In this aspect, the reflective surface 422 is not at the bottom surface 420 of the cover, and the material of the reflective surface 422 is not particularly limited as long as the emission light beam EL of the light source 411 is reflected.

More specifically, in this aspect, the light source 411 does not project the emission light beam EL toward the multiple protrusions 423. During operation, the light sensor 413 more or less receives reflected light from the bottom surface 420 (if no protrusion 423 being arranged). The reference value of the detection signal is increased when there is dust 90 accumulated on the bottom surface 420. Therefore, by arranging multiple protrusions 423 on the bottom surface 420, the influence on the reference value of the detection signal by the accumulated dust 90 is decreased so as to reduce the false alarm rate. The multiple protrusions 423 are identical to the multiple protrusions 323 in FIG. 3 and thus details thereof are not repeated herein.

More specifically, the difference between FIG. 4 and FIG. 3 is at the position configuration of the light source and the light sensor. The configuration of FIG. 4 is to cause the emission light beam EL and the reflected light RL1 to propagate upon the multiple protrusions 423. It is appreciated that the smoke detector 400 in FIG. 4 also includes a processor electrically coupled to the light sensor 413 for processing the detection signal therefrom.

Figure 5A:
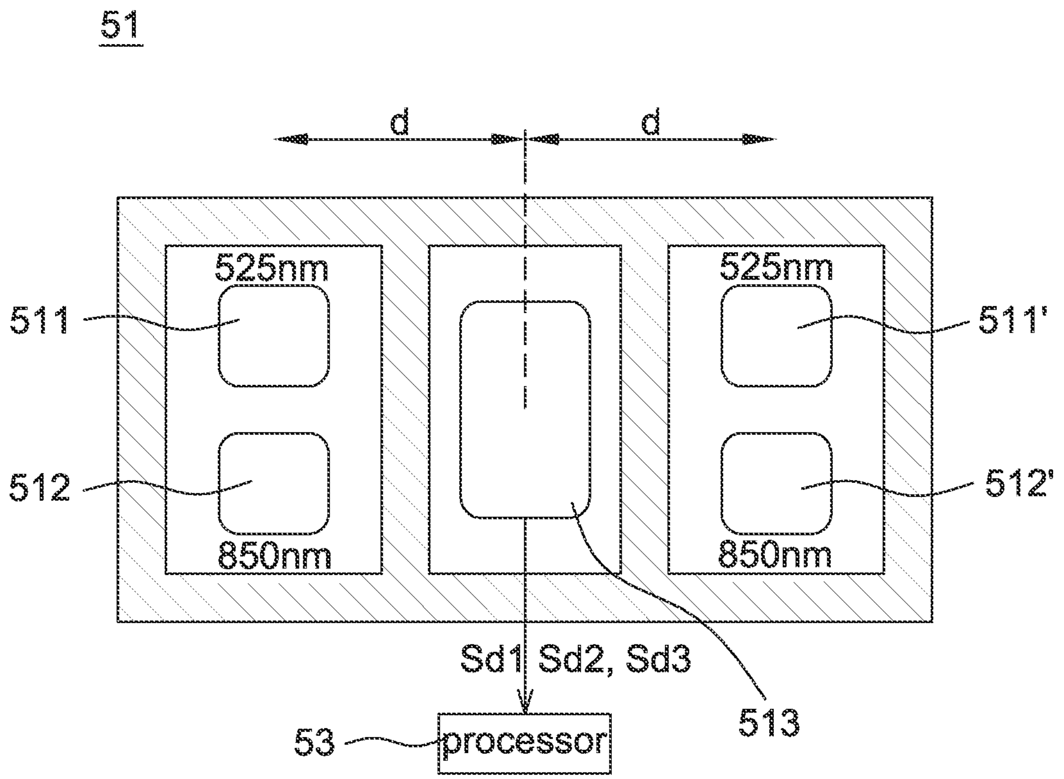
FIG. 5A is a schematic diagram of a sensing device of a smoke detector according to a third embodiment of the present disclosure.
Figure 5B:
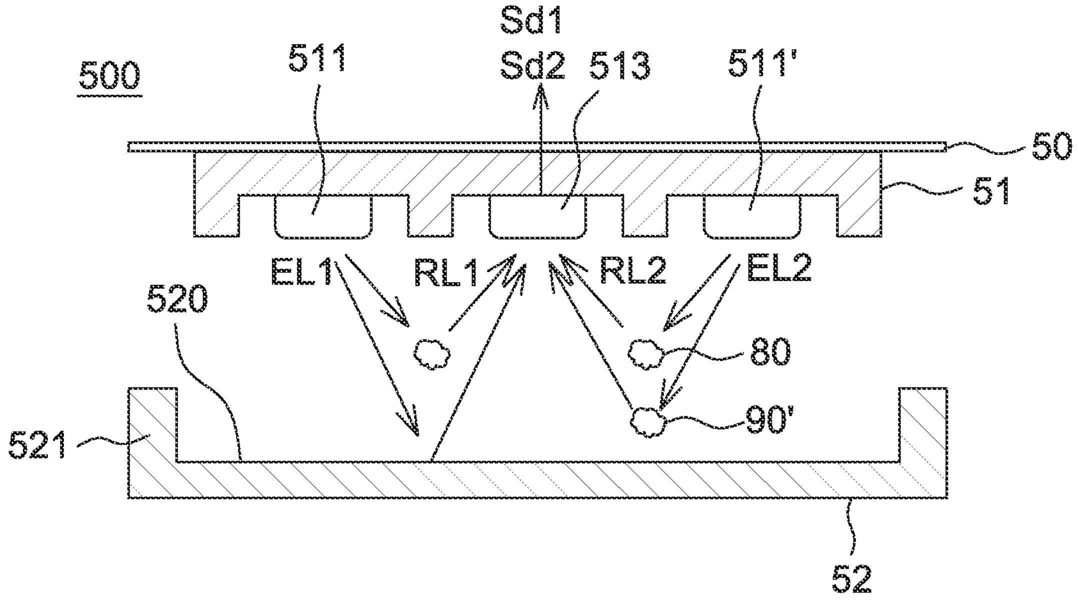
FIG. 5B is a cross sectional view of a smoke detector according to a third embodiment of the present disclosure.

Please refer to FIGS. 5A and 5B, FIG. 5A is a schematic diagram of a sensing device 51 of a smoke detector 500 according to a third embodiment of the present disclosure; and FIG. 5B is a cross sectional view of the smoke detector 500 according to a third embodiment of the present disclosure. The smoke detector 500 also includes a sensing device 51 and a cover 52, wherein the cover 52 is also combined to a base 50 to form a sensing space which has been illustrated above and thus details thereof are not repeated herein.

It should be mentioned that although FIG. 5B shows that the cover 52 is identical to the cover 12 of the first embodiment, the cover 52 is identical to the cover 32 of the second embodiment 32 in another aspect without particular limitations. More specifically, the difference between the third embodiment and the first and second embodiments is at the component arrangement of the sensing device 51.

The sensing device 51 includes a light sensor 513, a processor 53, a first light source 511 (or 512) and a second light source 511' (or 512'). Similar to the first embodiment, the light sensor 513 is a CMOS image sensor or a photodiode or a SPAD without particular limitations. The light sensor 513 is used to detect scattered and reflected light from the cover 52, the smoke 80 or floating particles 90' when different light sources are turned on to generate detection signals, e.g., light intensity signals.

The first light source 511 and the second light source 511' emit light of the same wavelength, e.g., 525 nm or 850 nm, but not limited to. The first light source 511 and the second light source 511' are coherent light sources or non-coherent light sources without particular limitations. The first light source 511 and the second light source 511' are respectively arranged at two opposite sides of the light sensor 513, and preferably having the same distance d from the light source 513, e.g., FIG. 5A showing that the first light source 511 is at the left side of the light sensor 513 and the second light source 511' is at the right side of the light sensor 513. Preferably, light blocking walls are arranged between the light sensor 513 and the light sources 511 and 511'.

The processor 53 is, for example, an MCU or an ASIC, which receives a first detection signal Sd1 when the first light source 511 is emitting light and receives a second detection signal Sd2 when the second light source 511' is emitting light. In one aspect, the first light source 511 and the second light source 511' emit light within different intervals such that the first light source 511 does not contribute intensity of the second detection signal Sd2 and the second light source 511' does not contribute intensity of the first detection signal Sd1.

The processor 53 distinguishes the smoke 80 or the floating particles 90' according to the similarly between the first detection signal Sd1 and the second detection signal Sd2. For example, when a difference or standard deviation between the first detection signal Sd1 and the second detection signal Sd2 is smaller than a predetermined threshold, the first detection signal Sd1 and the second detection signal Sd2 are similar; otherwise the first detection signal Sd1 and the second detection signal Sd2 are not similar.

For example referring to FIG. 5B, when the first light source 511 and the second light source 511' are sequentially turned on, the processor 53 sequentially receives the first detection signal Sd1 and the second detection signal Sd2. When there is smoke 80 entering the inner space (i.e. sensing space) of the smoke detector 500, the smoke 80 is uniformly distributed inside the cover 52 such that the first reflected light RL1 and the second reflected light RL2 have substantially identical intensity such that normalized intensity (Sd1−Sdr1)/Sdr1 and (Sd2−Sdr2)/Sdr2 (or Sd1/Sdr1 and Sd2/Sdr2) are substantially identical, wherein Sdr1 is the first detection signal (or reference detection signal) when there is no smoke or particles entering the sensing space, and Sdr2 is the second detection signal (or reference detection signal) when there is no smoke or particles entering the sensing space. The intensity normalization of the detection signal is to remove the influence of emission decay of light sources 511 and 511'.

However, when there are particles 90' entering the cover 52, the particles 90' are generally not uniformly distributed inside the cover 52 due to the wind direction and/or small quantity such that the first reflected light RL1 and the second reflected light RL1 have different intensity to cause the first detection signal Sd1 and the second detection signal Sd2 to be different. Accordingly, the processor 53 distinguishes the disturbance caused by floating particles 90' by arranging light sources having an identical wavelength at different sides of the light sensor 513 to decrease the false alarm rate. In this way, the processor 53 identifies the intensity variation between the smoke 80 and the floating particles 90'.

It should be mentioned that although FIG. 5A shows that 511 and 511' are symmetrical to (e.g., both separated by distance d) the light sensor 513, and 512 and 512' are symmetrical to (e.g., both separated by distance d) the light sensor 513, the present disclosure is not limited thereto. In other aspects, 511' is arranged at the position of 512' or 511 is arranged at the position of 512, i.e. not parallel to a transverse direction in FIG. 5A.

Furthermore, in the third embodiment, light sources having different emission wavelengths are arranged at the same side of the light sensor 513, e.g., arranging a third light source 512 and the first light source 511 at the same side of the light sensor 513, or arranging a third light source 512' and the second light source 511' at the same side of the light sensor 513, or arranging two third light sources 512 and 512' respectively at two opposite sides of the light sensor 513. The third light source 512 (or 512') emits light having a wavelength different from light wavelengths of the first light source 511 and the second light source 511'. In this aspect, the processor 53 further receives a third detection signal Sd3 from the light sensor 513 when the third light source 512 and/or 512' is emitting light, not together with the light emission of the light sources 511 and 511'. The processor 53 identifies a type of smoke or particles according to a relationship of features between the normalized intensity (Sd1−Sdr1)/Sdr1 (or the normalized intensity (Sd2−Sdr2)/Sdr2) and the normalized intensity (Sd3−Sdr3)/Sdr3, wherein Sdr3 is the third detection signal (or reference detection signal) when there is no smoke or particles entering the sensing space.

Figure 7A:
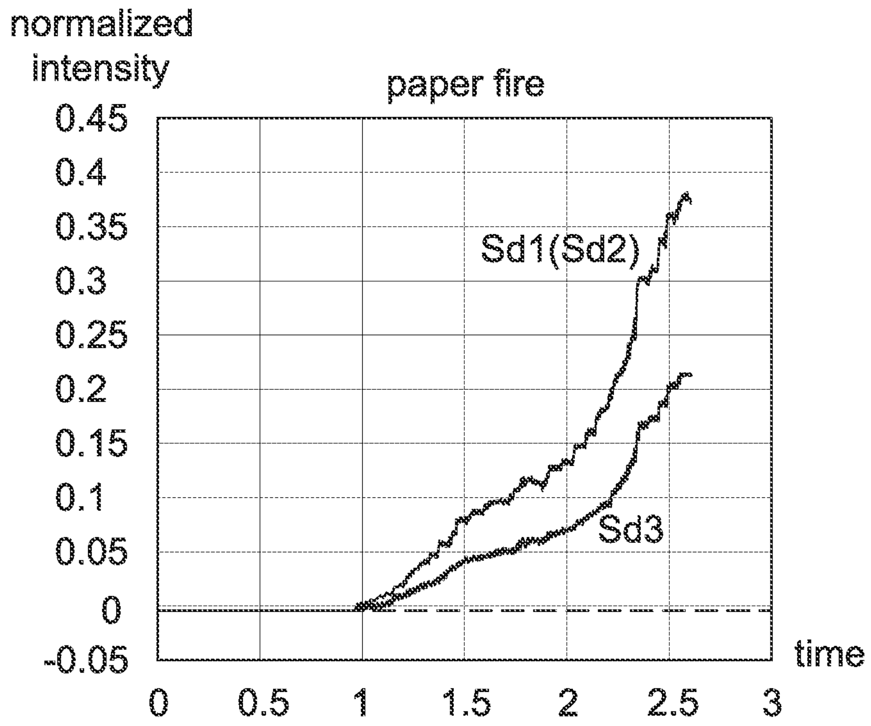
FIGS. 7A to 7C are schematic diagrams of detection signals of different types of smoke detected by a smoke detector of the present disclosure.
Figure 7B:
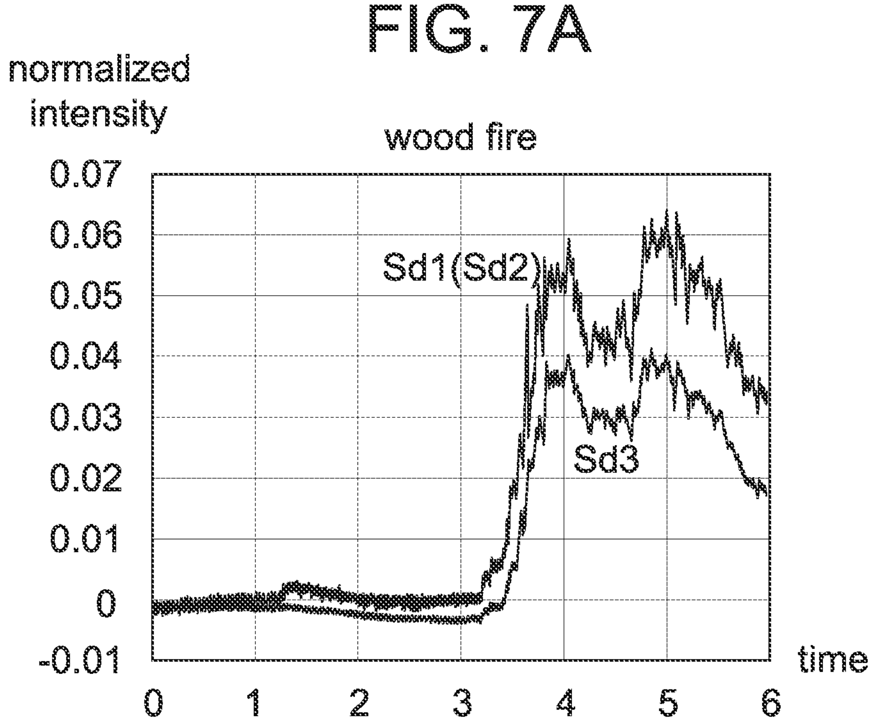
Figure 7C:
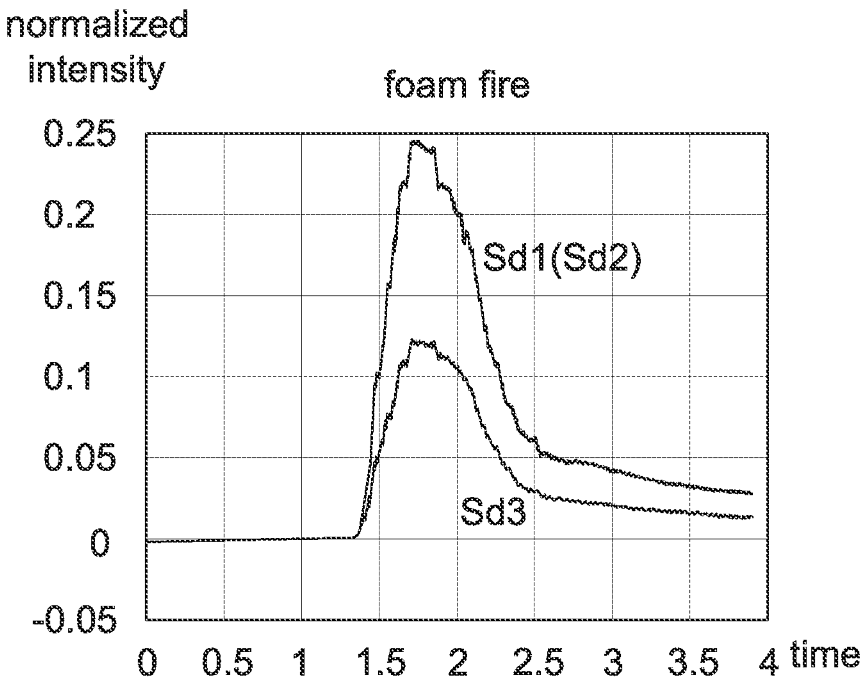

For example referring to FIGS. 7A-7C, although the first light source 511 and the third light source 512 emit light of different wavelengths, when the smoke 80 enters the inner space of the smoke detector 500, the first detection signal Sd1 and the third detection signal Sd3 have similar intensity variations (or trends). Accordingly, the processor 53 recognizes whether the disturbance is caused by the smoke 80 according to features of the detection signal Sd1 and Sd3, wherein the features include the normalized intensity, moving averages with time, slopes, standard deviations, peak pitches (or distances) and the used filter types of the first detection signal Sd1 and the third detection signal Sd3, but the features are not limited to those mentioned herein.

Accordingly, when the first detection signal Sd1 and the third detection signal Sd3 have different intensity variations (or different features), the processor 53 identifies the disturbance as the floating particles 90' due to low similarity therebetween. On the other hand, when the first detection signal Sd1 and the third detection signal Sd3 have substantially identical intensity variation (or identical features), the processor 53 identifies that there is smoke 80 entering the inner space due to the high similarity. In this way, the smoke detector 500 is able to eliminate the disturbance caused by the particles 90' thereby reducing the false alarm rate.

According to the above identification method, if a third light source 512' is arranged adjacent to the second light source 511', the processor 53 compares features between the second detection signal Sd2 and the third detection signal Sd3 to distinguish the smoke and the floating particles.

Furthermore, the processor (e.g., including 13, 33 and 53) of the smoke detector (e.g., including 100, 300, 400 and 500) of the present disclosure further selects one set of condition thresholds from multiple sets of predetermined condition thresholds according to a profile or above mentioned feature of a current detection signal generated by the light sensor (e.g., including 113, 313, 413 and 513), and the selected one set of condition thresholds are compared with the current detection signal to determine whether to give an alarm.

For example referring to FIG. 6, it shows that one set of condition thresholds is previously arranged respectively corresponding to different detection signal profiles (e.g., profile 1 to profile 4) and different smoke types (e.g., type 1 to type 2). That is, A1 to A4 (different from one another), B1 to B4 (different from one another) and C1 to C4 (different from one another) are thresholds associated with different features. In the present disclosure, when all thresholds in one set of condition thresholds are fulfilled, the smoke detector generates an alarm.

In one aspect, when the smoke detector of the present disclosure includes the light source of a single wavelength, the processor sets or selects currently used one set of condition thresholds according to a current detection signal, e.g., Sd3 shown in FIGS. 7A to 7C. For example, when the processor identifies that a slope of the current normalized intensity (Sd3−Sdr3)/Sdr3 or Sd3/Sdr3 is larger than B1, the set of predetermined condition thresholds corresponding to the profile 1 in FIG. 6 is selected; therefore, when the intensity of the current normalized intensity (Sd3−Sdr3)/Sdr3 or Sd3/Sdr3 is larger than A1, the smoke detector generates an alarm. However, during the detection and before the alarm is given, when the processor identifies that the slope of the current normalized intensity (Sd3−Sdr3)/Sdr3 or Sd3/Sdr3 is larger than B2 (e.g., B2>B1), the set of predetermined condition thresholds corresponding to the profile 2 in FIG. 6 is selected; therefore, when the intensity of the current normalized intensity (Sd3−Sdr3)/Sdr3 or Sd3/Sdr3 is larger than A2, the smoke detector generates an alarm. In other words, during the operation of the smoke detector of the present disclosure, when identifying that the profile of the detection signal is changed with time, the processor actively selects another set of condition thresholds among the multiple sets of predetermined condition thresholds (e.g., 4 sets being shown in FIG. 6, but not limited to). In this way, the condition thresholds are dynamically changed corresponding to actual conditions so as to decrease the false alarm rate.

It should be mentioned that although FIG. 6 shows multiple sets of predetermined condition thresholds, the present disclosure is not limited thereto. In other aspects, the smoke detector of the present disclosure is embedded with (e.g., in the memory) multiple sets of predetermined condition threshold ranges (i.e. including upper and lower thresholds).

In one aspect, when the smoke detector of the present disclosure includes light sources of different wavelengths (i.e. different main wavelengths), each set of predetermined condition thresholds further include a signal ratio (or feature ratio) between detection signals of different wavelengths. For example, when the processor identifies that a slope of the current normalized intensity (Sd3−Sdr3)/Sdr3 or Sd3/Sdr3 is larger than B1, the alarm is generated only when the intensity of the current normalized intensity (Sd3−Sdr3)/Sdr3 or Sd3/Sdr3 is larger than A1 and the signal ratio (or feature ratio) between the detection signals (e.g., Sd3 and Sd1) or between the normalized intensity of two wavelengths is smaller than C1.

It should be mentioned that a number of the condition thresholds in one set of predetermined condition thresholds is not particularly limited.

In the present disclosure, the multiple sets of predetermined condition thresholds are previously stored in a memory of the processor, and the user is able to change the used multiple sets of predetermined condition thresholds according to the requirement, e.g., different multiple sets of predetermined condition thresholds are selected corresponding to different national standards (e.g., including UL268 and UL217 of America, and EN1464 and EN54 of Europe, but not limited thereto), or corresponding to different arrangement environment (e.g., indoor and outdoor). More specifically, the smoke detector of the present disclosure is embedded with selectable or changeable multiple sets of predetermined condition thresholds for different operation environments.

Furthermore, as shown in FIGS. 7A to 7C, because the paper fire, wood fire and foam fire generate different smoke to cause the detection signals to be different and the relationship of features to be different. The processor of the present disclosure further selects a different set of condition thresholds from the multiple sets of predetermined condition thresholds according to different types of smoke. For example, the processor of the present disclosure is embedded with a categorizer implemented by hardware and/or firmware. When receiving at least one detection signal (e.g., at least one of Sd1, Sd2, Sd3), the processor categorizes a type of current smoke according to the feature of one detection signal or a relationship of features between two detection signals. Next, the processor selects one set of predetermined condition thresholds according to the determined type of smoke (e.g., type 1 to type 4 shown in FIG. 6). In FIGS. 7A to 7C, the vertical axis is shown as normalized intensity of the detection signal. For example, the processor calculates, in the initial state, an average signal values within a predetermined interval (e.g., 10 seconds) as a reference value, and then during operation the processor divides current values of the detection signal by this reference value and then minus 1 (configured as the normalized intensity) to obtain the detection signals Sd1 to Sd3 in FIGS. 7A to 7C.

In FIG. 6, the interval 1 to interval 4 are referred to a time interval respectively, and the alarm is given when all predetermined condition thresholds are fulfilled within the predetermined time interval.

It should be mentioned that although FIG. 6 shows that the smoke type and the detection signal profile have corresponding set of predetermined condition thresholds, the present disclosure is not limited thereto. In other aspects, the smoke type and the detection signal profile are associated with totally different sets of predetermined condition thresholds. That is, the smoke type and the detection signal profile determine different sets of condition thresholds.

Figure 8A:
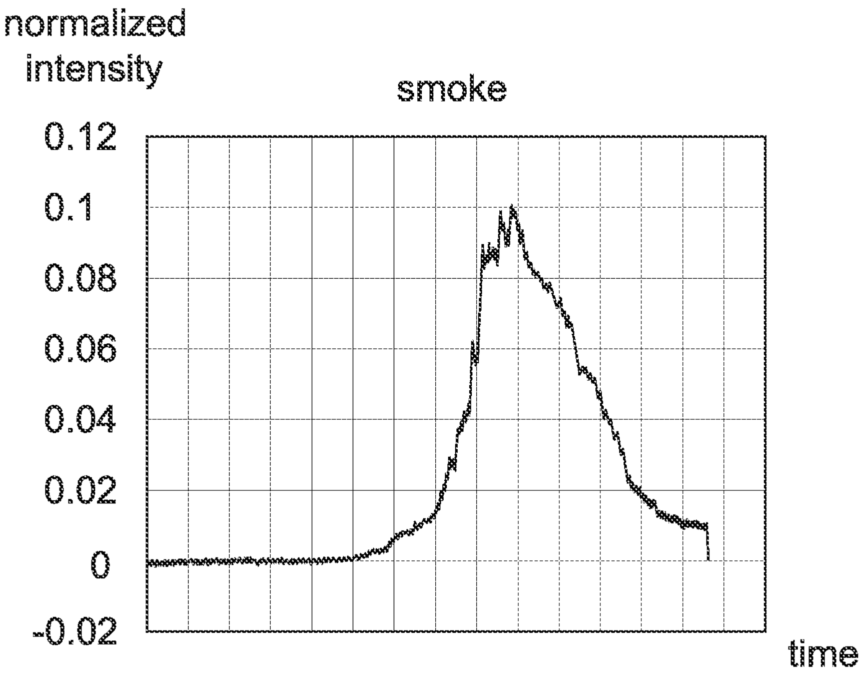
FIGS. 8A to 8C are schematic diagrams of detection signals of different objects detected by a smoke detector of the present disclosure.
Figure 8B:
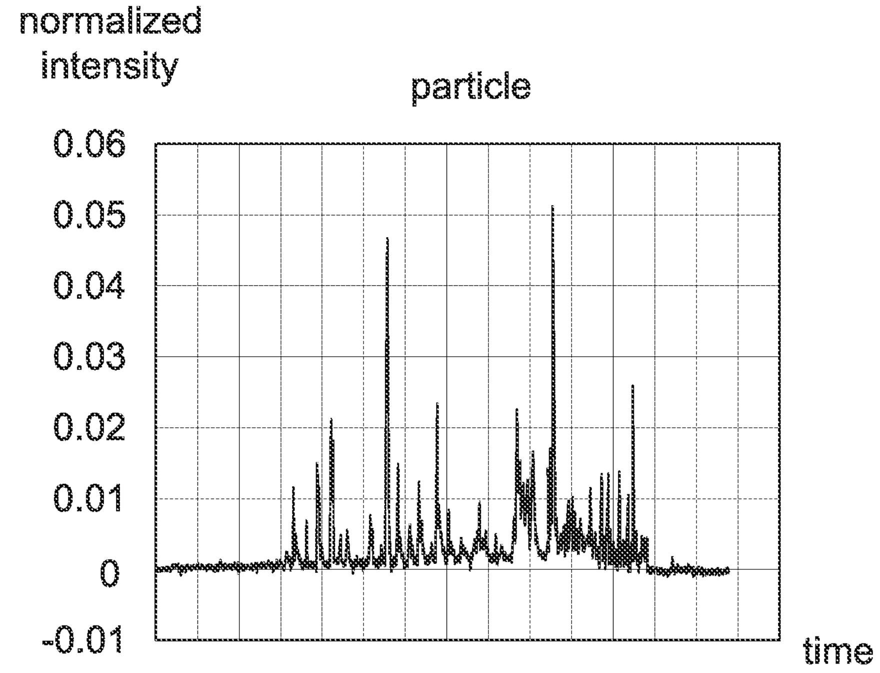
Figure 8C:
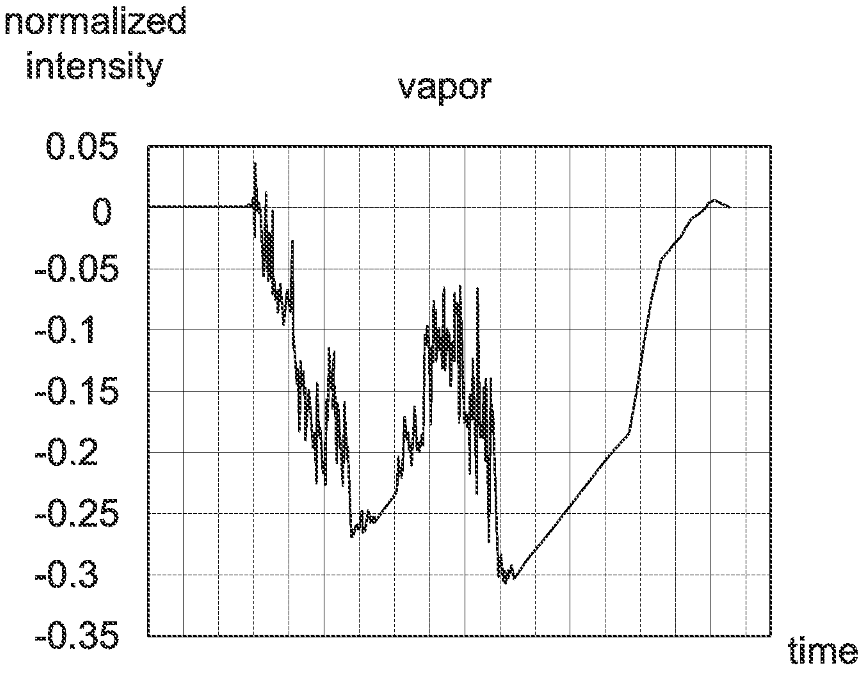

In addition to recognizing different types of smoke, the smoke detector of the present disclosure further recognizes whether the detection signal is changed by the smoke of fire. For example, as shown in FIG. 8A to 8C, the smoke, particle and vapor generate different profiles of detection signals (or called intensity variation). When the processor of the present disclosure identifies the detection signal has a signal variation (e.g., larger than TH1 as shown in FIG. 9), the categorizer embedded therein firstly identifies whether the signal change is caused by the fire. For example, when the categorizer identifies that the profile of the detection signal is belong to particle, vapor or caused by other non-flame objects, the processor does not compare the feature of the detection signal with any set of predetermined condition thresholds to avoid the false alarm. When the categorizer identifies that the profile of the detection signal is caused by the fire, the processor further selects one set of predetermined condition thresholds suitable to the current condition (determined according to the feature of a current detection signal), and then compares the selected set of condition thresholds with the followed detection values so as to determine whether to give an alarm.

Furthermore, the smoke detector (e.g., including 100, 300, 400 and 500) of the present disclosure further changes a sensing frequency according to the current detection signal so as to reduce the response time. For example referring to FIG. 9, in the initial state (e.g., no significant change in the detection signal), the light sensor of the smoke detector generates the detection signal using a first sensing frequency. When the processor identifies that the normalized intensity of the detection signal is larger than or equal to a first threshold TH1, it means that there might be a fire occurred and thus the processor controls the light sensor to increase to a second sensing frequency (also increasing the flicker frequency of the light source). When the processor identifies that the normalized intensity of the detection signal is larger than or equal to a second threshold TH2, the alarm is generated.

It should be mentioned that although FIG. 9 shows that the alarm condition is fulfilled when the normalized intensity exceeds a second threshold TH2, the present disclosure is not limited thereto. In other aspects, the alarm condition is satisfied when one set of predetermined condition thresholds as shown in FIG. 6 are fulfilled.

Similarly, the first threshold TH1 is replaced by one set of predetermined condition thresholds instead of using a single threshold. Meanwhile, the first threshold TH1 and the second threshold TH2 are dynamically or actively changed according to the standard, current detection signal and smoke type as mentioned above instead of being altered manually by a user or maintained as a fixed value.

It should be mentioned that the detection signal mentioned in descriptions of FIGS. 7A to 7C, FIGS. 8A to 8C and FIG. 9 are those detection signals mentioned in the first embodiment to the third embodiment. In other words, the processor in the first embodiment to the third embodiment selects one set of predetermined condition thresholds, recognize disturbance and/or adjust sensing frequency according to a current detection signal.

In the present disclosure, the term "particle" is referred to the substance floating in the air, and the term "dust" is referred to the substance accumulated in the bottom of cover for the illustration purposes.

In the present disclosure, the normalized intensity is calculated using, for example, (current detection value/reference value) as FIG. 9, or calculated using (current detection value/reference value)−1 as FIGS. 7A to 7C and 8A to 8C.

In the present disclosure, in distinguishing the smoke, dust or particles, in identifying the smoke type and in determining whether to give alarm, the current detection signal is firstly normalized by a reference detection signal by the processor so as to eliminate the influence of emission decay of the light source.

As mentioned above, the conventional smoke detector uses a single threshold such that it is unable to adapted to different environments, e.g., the disturbance amount is different indoor and outdoor. Furthermore, different types of smoke can generate different detection signals to have a higher false alarm rate. Accordingly, the present disclosure further provides a smoke detector having a low false alarm rate (e.g., FIGS. 1B, 3-4 and 5A-5B) that alter the used multiple condition thresholds corresponding to different standards or current detection results to effectively reduce the false alarm rate. In addition, the smoke detector of the present disclosure is further arranged with a light blocking structure to block scattered light and reflected light caused by accumulated dust to further reduce the false alarm rate.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A smoke detector, comprising:

a base;

a cover, configured to be combined to the base to form an inner space between the base and the cover;

a first light source, arranged on the base and configured to emit light of a wavelength toward the inner space;

a second light source, arranged on the base and configured to emit light of the wavelength toward the inner space;

a light sensor, arranged on the base between the first light source and the second light source, and configured to generate a first detection signal in response to light emission of the first light source and generate a second detection signal in response to light emission of the second light source; and a processor, configured to distinguish smoke and floating particles in the inner space according to a similarity between the first detection signal and the second detection signal.

2. The smoke detector as claimed in claim 1, wherein the wavelength is 525 nm or 850 nm.

3. The smoke detector as claimed in claim 1, wherein the processor is configured to calculate a difference or a standard deviation between the first detection signal and the second detection signal as the similarity.

4. The smoke detector as claimed in claim 1, wherein the first light source and the second light source are configured to sequentially emit light.

5. The smoke detector as claimed in claim 1, wherein when identifying that the first detection signal and the second detection signal have identical intensity or normalized intensity, the processor identifies the smoke in the inner space, and when identifying that the first detection signal and the second detection signal have different intensity, the processor identifies the floating particles in the inner space.

6. The smoke detector as claimed in claim 1, wherein the first light source and the second light source are symmetrically arranged at two sides of the light sensor.

7. The smoke detector as claimed in claim 1, wherein the first light source and the second light source are diagonally arranged at two sides of the light sensor.

8. The smoke detector as claimed in claim 1, further comprising light blocking walls between the light sensor and the first and second light sources.

9. The smoke detector as claimed in claim 1, wherein the cover comprises a bottom surface facing the base, and the bottom surface comprises multiple protrusions extending out from the bottom surface.

10. The smoke detector as claimed in claim 9, wherein the multiple protrusions are circular cylinders, triangular cylinders, rectangular cylinders or long strips.

11. A smoke detector, comprising:

a base;

a cover, configured to be combined to the base to form an inner space between the base and the cover;

a first light source, arranged on the base and configured to emit light of a first wavelength toward the inner space;

a second light source, arranged on the base and configured to emit light of a second wavelength, different from the first wavelength, toward the inner space;

a light sensor, arranged on the base, and configured to generate a first detection signal in response to light emission of the first light source and generate a second detection signal in response to light emission of the second light source, wherein the first light source and the second light source are arranged at a same side of the light sensor; and a processor, configured to identify smoke and floating particles according to a relationship of features between the first detection signal and the second detection signal.

12. The smoke detector as claimed in claim 11, wherein the first wavelength is 525 nm and the second wavelength is 850 nm.

13. The smoke detector as claimed in claim 11, wherein the first light source and the second light source are configured to sequentially emit light.

14. The smoke detector as claimed in claim 11, wherein the features comprise normalized intensity, moving averages with time, slopes, standard deviations, peak pitches and used filter types of the first detection signal and the second detection signal.

15. The smoke detector as claimed in claim 11, wherein when identifying that the first detection signal and the second detection signal have similar intensity variations, the processor identifies the smoke in the inner space, and when identifying that the first detection signal and the second detection signal have different intensity variations, the processor identifies the floating particles in the inner space.

16. The smoke detector as claimed in claim 11, wherein when identifying that the first detection signal and the second detection signal have low similarity, the processor identifies the floating particles in the inner space, and when identifying that the first detection signal and the second detection signal have high similarity, the processor identifies the smoke in the inner space.

17. The smoke detector as claimed in claim 11, further comprising a third light source arranged at an opposite side of the light sensor and configured to emit light of the first wavelength.

18. The smoke detector as claimed in claim 17, wherein the light sensor is further configured to generate a third detection signal in response to light emission of the third light source, and the processor is further configured to distinguish the smoke and the floating particles in the inner space according to a similarity between the first detection signal and the third detection signal.

19. The smoke detector as claimed in claim 11, wherein the cover comprises a bottom surface facing the base, and the bottom surface comprises multiple protrusions extending out from the bottom surface.

20. The smoke detector as claimed in claim 19, wherein the multiple protrusions are circular cylinders, triangular cylinders, rectangular cylinders or long strips.

* * * * *